J. LOWE.
Steam Pressure Gage.
No. 20,851.
Patented July 6, 1858.
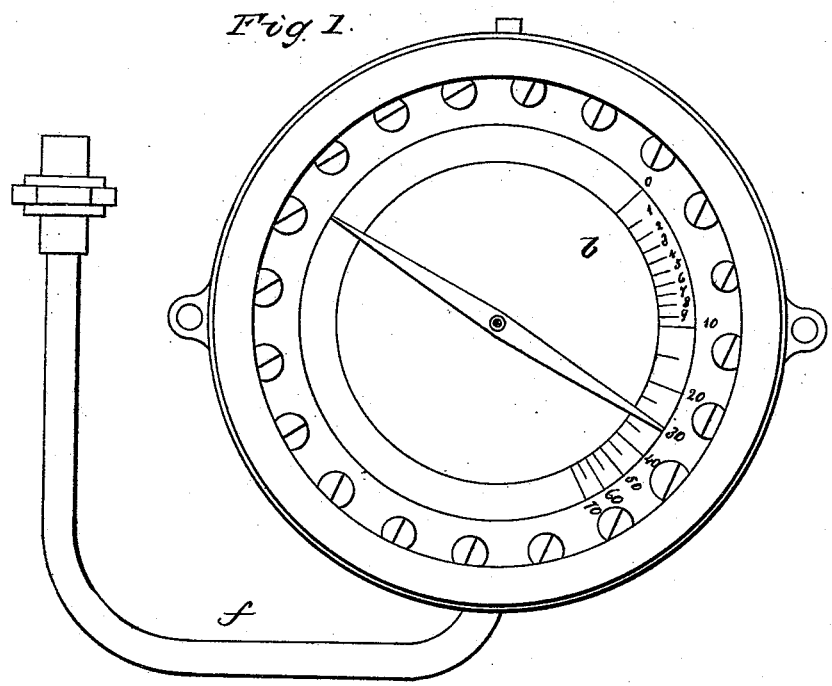
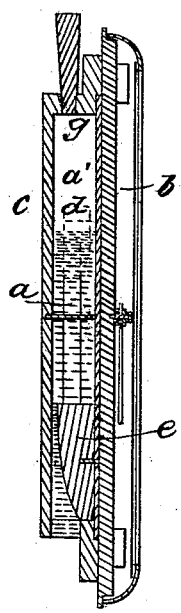
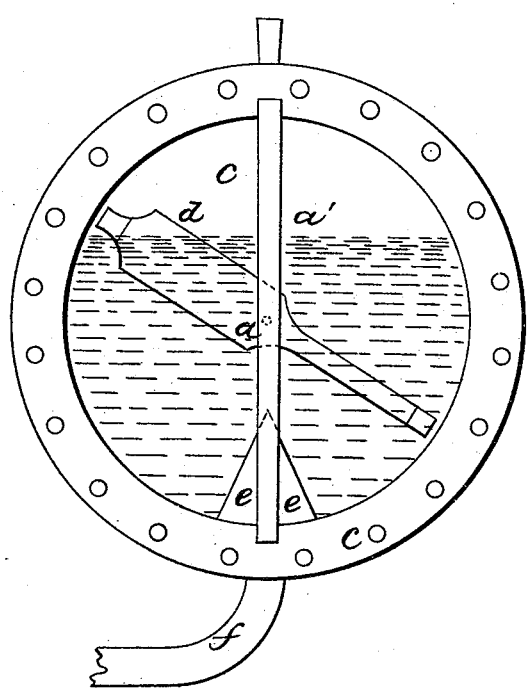

UNITED STATES PATENT OFFICE.

JOSHUA LOWE, OF NEW YORK, N. Y., ASSIGNOR TO HIMSELF AND DANIEL BARNUM, OF JERSEY CITY, NEW JERSEY.

IMPROVED MAGNETIC STEAM-GAGE.

Specification forming part of Letters Patent No. 20,851, dated July 6, 1858.

*To all whom it may concern:*

Be it known that I, JOSHUA LOWE, of the city, county, and State of New York, have invented a new and useful improvement in the tight-chambered compressed-air and mercury pressure gage, as well as in the mercury vacuum-gage, by combining therewith a self-adjusting or floating magnet, a magnetic needle, and a dial or index plate, thus producing magnetic pressure and vacuum gages which mark the amount of pressure or of vacuum by the seen indications of a magnetic needle; and I do hereby declare the following to be a full and clear description of the same, reference being had to the accompanying drawings, which make part of this specification.

Figure 1 is a front elevation of a magnetic pressure-gage at work, giving an indication of thirty pounds pressure by the point of the needle, which is seen over figure 30 on the index-dial. Fig. 2 is a side sectional view, showing the interior, with an opening into the chamber at the top for charging the chamber with the proper proportions of mercury to adjust the point of the needle to the scale on the index, which opening is to be closed when the chamber is charged, which is to be done after the gage is set up. The magnet is seen floating in the mercury with the point of the needle opposite to it on the outside of the dial. One pole of the magnet, as well as of the needle, is not seen in this figure. Fig. 3 is a front view with the dial removed, showing the shape or manner of constructing the magnet so as to make it float on the mercury, and thus to make it self-adjusting, as the pressure causes the mercury to flow up or down in the chamber. The cross-bar for supporting one of the pivots on which the magnet is hung in the center, as well as a stop to prevent the poles of the magnet from changing sides in the chamber, are also shown in this figure.

The nature of my invention consists in combining tight-chambered mercury-gages for steam-pressure or vacuum with self-adjusting or floating magnets, magnetic needles, and index-dials, or their equivalents, the whole being constructed, arranged, and combined in such a manner as to produce magnetic mercury pressure and vacuum gages that will give true magnetic indications of varying degrees of pressure occurring within steam-boilers, or of vacuum in condensers.

To enable others to make and use my invention, I remark that I first construct a magnet having a north and south pole of about four inches in length, with pivots in the center, as seen at $a$, Figs. 2 and 3, upon which pivots it is to be hung within a small isolated mercury pressure or vacuum gage chamber formed by an index-plate and dial and a dish-shaped casting, as shown in Fig. 2, $b$ being the dial-plate, of brass, and $c$ the dish-shaped casting, of iron.

The drawings represent a full-sized machine. The size, however, as well as the form, may be varied. The length of the magnet should not be increased, for the reason that when the magnet and needle are placed at right angles the points of attraction are so remote that certain action cannot be relied upon. The form of the magnet is seen at $d$, Fig. 3. The form is not material, except that one arm is required to be made larger than the other, so as to insure its floating on the surface of the mercury, rising and falling with it. The magnetic needle is made in the ordinary way. It is seen in place over the index plate or dial in Fig. 1. Its length corresponds with the magnet. A sheet of thin rubber is used between the dial-plate and the part which forms the chamber to secure a perfect joint. The screws seen on the face of the dial are used to form the joint. A cross-bar, $a'$, is seen in Figs. 2 and 3, sustaining one end or pivot on which the magnet hangs at $a$. A stop is also seen in these figures at $e$. This prevents the poles of the magnet from changing sides in the chamber, and thus insures the true position of the magnet and index-point of the needle, so that it cannot get out of order by handling or otherwise. A bent tube is shown in Figs. 1 and 3 at $f$. This tube acts as a receiving-chamber (in place of which a secondary chamber may be constructed within the body of the instrument) for the mercury while charging the gage with the same previous to the application of pressure, and from which tube or chamber the mercury is forced by the pressure into the chamber of the gage in the exact ratio of the pressure applied. At the top of the gage is an opening, $g$, for the purpose of charging it with mercury and air in proper proportions. To determine the proportion, mercury should be poured in until the point of the needle points to zero, or to the 0 on the index, when the instrument is in working order, the opening on the top at *j* being closed. The index on the dial is graduated under a column of mercury and is correct. The vacuum-index may be made upon the opposite side of the same dial-plate, and the same instrument may be used either as a pressure or a vacuum gage by changing the connections from a boiler to a condenser, or from a condenser to a boiler, and charging the gage, as before stated, (for a pressure-gage,) or by filling the entire chamber before closing the opening *g* with mercury for a vacuum-gage.

Having thus fully described my invention and pointed out some of its uses, I remark that its advantages are compactness, cheapness, convenience, and, above all, durability and certainty of action.

I am aware that air and mercury have heretofore been combined and used in tight isolated or separate chambers to make pressure-gages, but not in combination with a self-adjusting magnet and traversing needle.

I am aware, also, that magnets, dial-plates, and needles have been used in combination, but not in a tight isolated chamber separated from the steam-boiler or other means of making pressure, or for the purpose of making or indicating either pressure within a boiler or a vacuum in a condenser. I therefore do not claim either of these, except as herein specified and for the purposes named; but What I do claim as my invention, and desire to secure by Letters Patent of the United States, is—

1. The construction of a polar magnet with one arm or pole larger than the other, so that the enlarged pole will float on the surface of mercury, whether the lesser pole be immersed or not, whenever the said magnet is placed within a chamber filled or partially filled with mercury and hung on pivots in the center, thus making a self-adjusting movable magnet capable of being used as a floating magnet within a small tight chamber, substantially as described and shown.

2. The combination of a floating magnet, a magnetic needle, and a dial or index plate, forming one side of an isolated tight chamber, and with mercury and air within said chamber, or their equivalents, for the purpose of making a magnetic pressure-gage, substantially as described and shown.

3. The combination of a floating magnet, a magnetic needle, and a dial or index plate, forming one side of an isolated tight chamber, and with mercury or other fluid within said chamber, for the purpose of making a magnetic vacuum-gage, substantially as described and and shown.

JOSHUA LOWE.

In presence of—
 HUGH MARTIN,
 HENRY C. BANKS.